Aug. 23, 1932.   L. C. MAMBOURG   1,872,776
APPARATUS FOR FORMING SHEET GLASS
Filed July 16, 1931   2 Sheets-Sheet 1
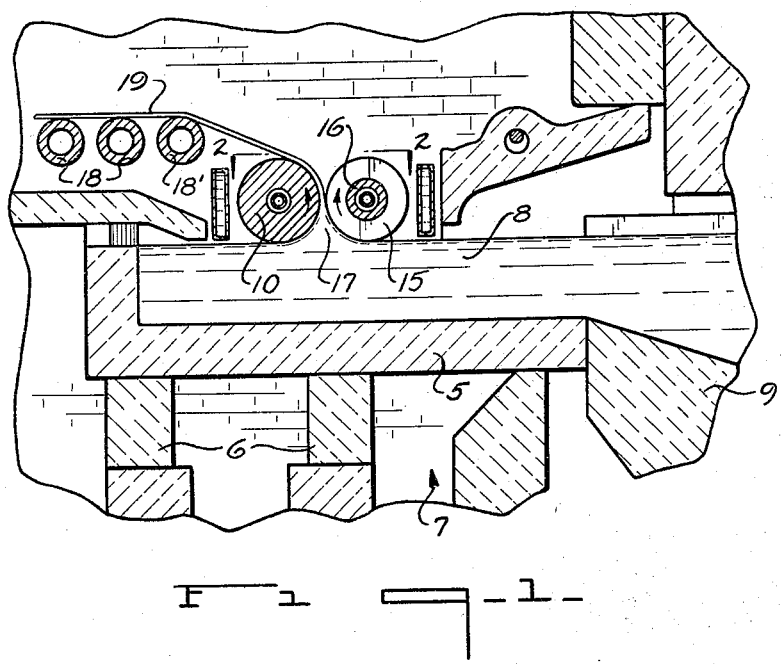
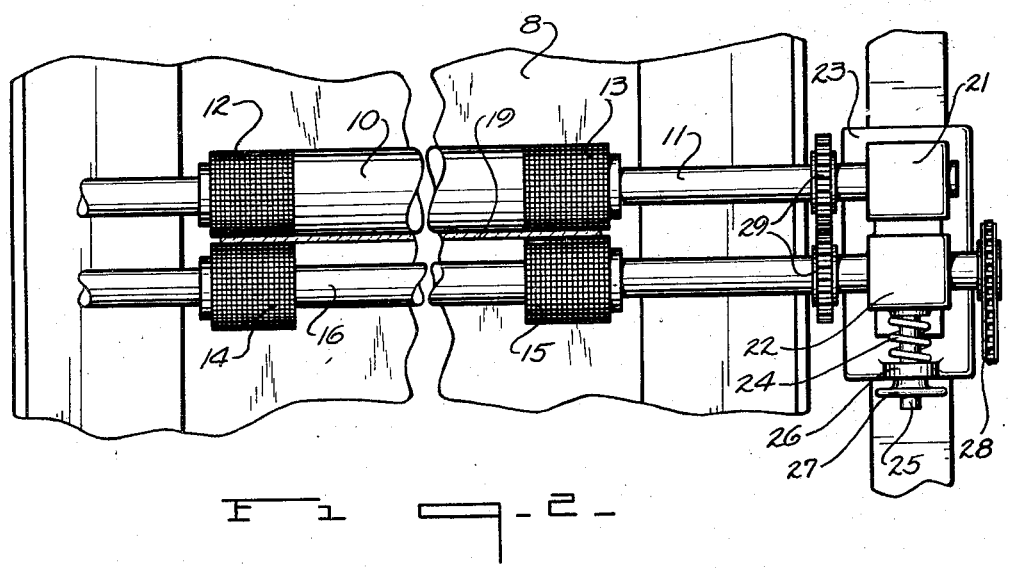
INVENTOR
Luke C. Mambourg
BY
Frank Fraser
ATTORNEY

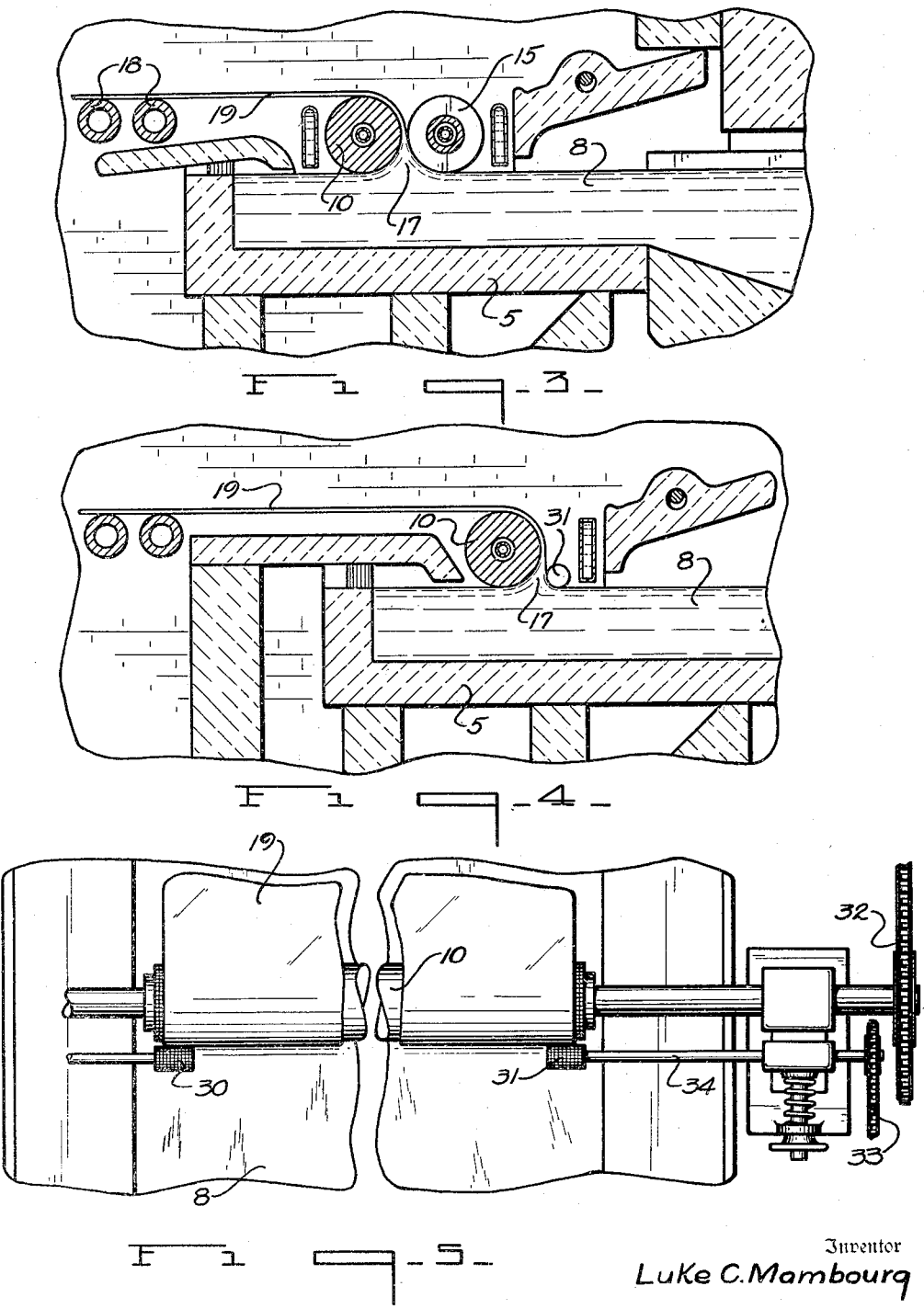

Patented Aug. 23, 1932

1,872,776

UNITED STATES PATENT OFFICE

LUKE C. MAMBOURG, OF LANCASTER, OHIO, ASSIGNOR TO LIBBEY-OWENS-FORD GLASS COMPANY, OF TOLEDO, OHIO, A CORPORATION OF OHIO

APPARATUS FOR FORMING SHEET GLASS

Application filed July 16, 1931. Serial No. 551,201.

The present invention relates to improvements in apparatus for forming sheet glass.

In the production of sheet glass according to one known process, a pair of relatively large sheet forming rolls are mounted side by side above and in relatively close proximity to the surface of a bath of molten glass contained within a working receptacle or draw pot. These two rolls are spaced from one another to create a sheet forming pass therebetween and, upon rotation, are adapted to draw a relatively heavy body of molten glass upwardly from the molten bath and reduce it to a sheet of substantially predetermined and uniform thickness. The sheet thus produced, however, is not of a wholly transparent nature since, in order that the rolls may provide sufficient traction for feeding the glass upwardly from the molten bath, it is necessary that the surfaces thereof be slightly roughened. Were the rolls used highly polished, the sheet produced thereby would be transparent, but it is practically impossible with the use of highly polished rolls to effect a positive feeding of the necessary amount of molten glass upwardly to the sheet forming pass created therebetween, to permit the desired rolling operation.

According to this invention, a transparent sheet of glass is adapted to be formed by feeding a relatively heavy body of glass upwardly from a bath of molten glass in contact with a single relatively highly polished rotatable roll, the glass being deflected about the said roll and extending lengthwise by a drawing action into a sheet of substantially predetermined dimensions, means being provided to cooperate with the said rolls in a manner to assist in feeding the desired body of glass upwardly and for also maintaining the sheet being formed to width.

Other objects and advantages of the invention will become more apparent during the course of the following description when taken in connection with the accompanying drawings.

In the drawings forming part of this application and wherein like numerals are employed to designate like parts throughout the same, Fig. 1 is a vertical longitudinal section through one form of apparatus provided by the present invention, Fig. 2 is a view taken substantially on line 2—2 of Fig. 1, Fig. 3 is a view similar to Fig. 1 but showing a slightly modified form of apparatus, Fig. 4 discloses still another form of the invention, and Fig. 5 is a plan view of Fig. 4.

Referring to the drawings, and particularly with reference first to Figs. 1 and 2, there is provided a relatively shallow working receptacle or draw pot 5 supported upon stools 6 within a heating chamber 7 and adapted to contain a mass of molten glass 8 supplied thereto from a furnace 9 of any preferred construction.

Positioned above the mass of molten glass 8 within working receptacle 5 and closely adjacent to the surface thereof is a relatively large rotatable roll 10, said roll extending transversely of the said working receptacle and being mounted upon a shaft 11. The opposite end portions of the roll 10 are roughened or knurled as shown at 12 and 13 respectively, while the main body portion thereof between the knurled portions is adapted to be highly polished. Positioned horizontally with respect to the roll 10 and disposed opposite the knurled portions 12 and 13 thereof are the two knurled rollers 14 and 15 respectively, said rollers being of substantially the same diameter as roll 10 and being carried upon a common shaft 16.

In the operation of the invention, the roll 10 and knurled rollers 14 and 15 are positively driven in the directions indicated by the arrows in Fig. 1 and, upon such rotation, the knurled rollers are adapted to cooperate with roll 10 in a manner to feed a relatively heavy body of molten glass 17 upwardly from the molten bath 8. This upwardly moving glass is then deflected about the roll 10 into an inclined plane and thence into the horizontal plane about the first roll 18' of a series of horizontally arranged rolls 18 which serve to deliver the glass into an annealing leer. As the body of glass 17 is moved upwardly about roll 10, it is extended lengthwise by a drawing operation to form a sheet 19 of substantially predetermined and uniform thickness. In addition to assisting in feeding the requisite amount of glass upwardly from the molten bath, the knurled rollers 14 and 15 also cooperate with the knurled end portions 12 and 13 of roll 10 to maintain the sheet being formed to width and thus prevent narrowing thereof. Since the main body portion of roll 10 between the roughened end portions is highly polished, the sheet formed will be transparent except for the border portions thereof which are engaged by the knurled rollers.

The means for supporting and driving the roll 10 and knurled rollers 14 and 15 is illustrated in Fig. 2 and, upon reference thereto, it will be seen that the shafts 11 and 16 are journaled at each end within bearing blocks 21 and 22 respectively supported upon a base member 23. The bearing block 21 is preferably fixed, while the bearing block 22 is slidable toward and away from block 21. The bearing block 22 is yieldably urged toward bearing block 21 by means of a compression spring 24 encircling bolt 25, said bolt passing through a bracket 26 and having an adjusting wheel 27 threaded upon its outer end. The provision of the springs 24 will serve to urge the knurled rollers 14 and 15 toward the roll 10 but will permit of them being readily moved apart to permit the passage of foreign matter therebetween, the limit of inward movement of the knurled rollers toward the roll 10 being controlled by the hand wheel 27. One of the shafts, and as here shown shaft 16, is positively driven through a suitable driving means 28, and the shaft 11 is driven from shaft 16 through the intermeshing gears 29 carried thereby.

The roll 10 is adapted to be internally cooled by the circulation of a suitable cooling medium such as air or water through the shaft 11 thereof, and likewise the knurled rollers 14 and 15 are preferably cooled by passing a cooling medium through shaft 16. Inasmuch as the shaft 16 extends between the knurled rollers, it will also have a cooling effect upon that surface of the glass adjacent thereto and thereby offset the cooling of the opposite surface of the glass in contact with roll 10.

The form of the invention illustrated in Fig. 3 is substantially the same in all respects as that described hereinabove, with the exception that the sheet 19 is deflected entirely about the roll 10 into the horizontal plane instead of being passed upwardly first through an inclined plane and then deflected into the horizontal plane.

In Figs. 4 and 5, instead of employing relatively large knurled rollers having a diameter substantially equal to that of roll 10, relatively smaller knurled rollers 30 and 31 are used. These rollers, however, cooperate with roll 10 in the same manner as rollers 14 and 15 described above. With this arrangement, however, a separate drive means is provided for the roll 10 and the knurled rollers 30 and 31 so that they may be driven independently of one another, the drive for roll 10 being designated 32, and the drive for the knurled rollers 33. Also, in this case, the two knurled rollers are not connected together but, on the contrary, are mounted and driven independently of one another. Otherwise, the mounting for the knurled rollers 30 and 31 is substantially the same as disclosed in Fig. 2.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of forming sheet glass which consists in drawing a relatively heavy body of molten glass upwardly from a molten bath and in contact with a continuously revolving surface, in deflecting the glass about said surface and extending it lengthwise to form a sheet of the desired thickness, and in maintaining the sheet to width by gripping the upwardly moving body of glass adjacent each edge thereof only between said continuously revolving surface and an additional continuously revolving surface.

2. The process of forming sheet glass which consists in drawing a relatively heavy body of molten glass upwardly from a molten bath and in contact with a continuously revolving surface, in deflecting the glass about said surface and extending it lengthwise to form a sheet of the desired thickness, and in causing a positive upward feed movement of the molten glass by gripping the body of glass throughout a portion only of its width between said continuously revolving surface and a second continuously revolving surface also turning in the direction of feed of the glass.

3. The process of forming sheet glass which consists in drawing a relatively heavy body of molten glass upwardly from a molten bath and in contact with a continuously revolving surface, in deflecting the glass about said surface and extending it lengthwise to form a sheet of the desired thickness, and in causing a positive upward feed movement of the molten glass by gripping the body of glass adjacent each edge thereof only between the first continuously revolving surface and a second continuously revolving surface also turning in the direction of feed of the glass.

Signed at Lancaster, in the county of Fairfield and State of Ohio, this 14th day of July, 1931.

LUKE C. MAMBOURG.